Patented Feb. 11, 1941

2,231,476

UNITED STATES PATENT OFFICE 2,231,476

CONFECTION OF THE GUMDROP TYPE CONTAINING THIN BOILING, HIGH FLUIDITY, HIGH SCOTT STARCH

Harry Meisel, North Bergen, N. J., assignor to Corn Products Refining Company, New York, N. Y., a corporation of New Jersey No Drawing. Application July 13, 1939, Serial No. 284,200

2 Claims. (Cl. 99—134)

This invention relates to the production of a thin boiling starch, more particularly corn (maize) starch, which, in proportion to its fluidity (measured when cold as hereinafter described) will have a high viscosity (measured by what is known as the Scott test, to be described below, for measuring the viscosity of hot thin boiling starch pastes).

The usual relation between fluidity and Scott viscosity is expressed by the equation $$\text{fluidity} = \frac{2000}{\text{Scott}}$$

that is, Scott multiplied by fluidity equals 2000 so that for a 60 fluidity thin boiling starch the Scott will be approximately 33. It will be understood that this relationship is only approximate, differing slightly for different products.

The object of the present invention is the production of a thin boiling starch having a Scott very considerably above normal for the equation just given; that is, a thin boiling starch, the Scott of which is substantially increased without proportional reduction of fluidity. For example, it is possible in accordance with this invention to produce a thin boiling starch having a Scott of 70 instead of about 30–35, which is normal for a 60 fluidity product, without decreasing the fluidity as measured by the test to be referred to.

A thin boiling starch having these apparently anomalous characteristics can be advantageously used in making confections of the gumdrop type in which starch is used to give body. Body is determined somewhat arbitrarily by feel between the fingers or when the piece is chewed. Accurate measurement is probably not possible, but differences in body are nevertheless easily recognized. The gumdrop mixture must readily flow in order that it may be poured into molds. Hence, the starch must have a relatively high fluidity. The Scott represents body and as body is increased the amount of starch used may be decreased. Such decrease makes a saving in materials and tends to improve the flavor of the confection.

For example, with a thin boiling corn starch of known type having a fluidity of 60 and a Scott of about 33, 11% of starch (commercial water content) may be necessary in order to give the gumdrop the proper body. With a 60 fluidity, a 70 Scott starch, made in accordance with the present invention, the starch content of the gumdrop may be reduced to in the neighborhood of 10%.

A common formula for making gumdrops is as follows:

With a syrup made by mixing five pounds of sucrose, five pounds of corn syrup and six pounds of water, is mixed a starch milk made by suspending 1.5 pounds of thin boiling starch in eight pounds of water. The mixture of sugar syrup and starch milk is boiled until evaporated down to a moisture content of about 24%. The hot evaporated mixture is poured into molds which have been dusted with starch. The gumdrops in the molds are tempered at about 135° F. for twenty-four hours.

The above represents a formula using a known 60 fluidity, 30–35 Scott thin boiling starch. By using a starch, made in accordance with the present invention having the same fluidity but a Scott of about 70, the quantity of starch may be reduced to about 10.2%.

The process of producing a starch having these characteristics, that is, high fluidity and also high Scott, differs radically from the process for producing a thin boiling starch having the usual relation of Scott to fluidity expressed in the above equation. The time of conversion or modification is very much reduced. The temperature at which the conversion takes place is also considerably reduced. The acidity, on the contrary, is increased very greatly.

These process changes bring about the unexpected and apparently anomalous characteristics above referred to.

The following is a specific example of the application of the invention to practice. The aim is to obtain a thin boiling starch having a fluidity of 60 and as high a Scott as possible for this fluidity. Obviously, the process might be employed to produce starches of different fluidity but with always higher Scotts than are represented by the equation given above. Apparently the low converting temperature and brief conversion period are critical factors in keeping up the Scott. The fluidity, however, is raised to the relatively high level by the large quantity of acid.

*Example.*—Raw corn starch and water are mixed to form a starch milk of 22° Baumé and sufficient commercial hydrochloric acid is added to give the starch milk such an acidity that when 10 cc. of filtrate are obtained by filtering the starch milk the filtrate will require 60 cc. of a one-tenth normal caustic soda solution to neutralize it. This mixture of starch, water and acid is heated to 102° F., with agitation, for three hours, or until the starch tests 60 fluidity, whereupon the mixture is neutralized with a strong soda ash solution to a pH of about 5.2 (5.0–5.5) and the material de-watered and washed on a filter and dried. The product will have a fluidity of 60 and a Scott of about 70.

Some variation is possible in the operating data given above without much affecting the resulting product. The conversion temperature may vary between 100° and 104° F.; the acidity measurement, given as 60, between 57 and 63 cc.; and the time between 2½ and 3½ hours.

With the information which has been given, those skilled in the art will be able to change the formula so as to adapt it to starches of different fluidities.

For comparison an ordinary 60 fluidity thin boiling starch process differs from the process of the above example in the following respects: the time of conversion is seventeen hours instead of three hours; the temperature 124° F. instead of 102° F., and the acidity is represented by the figure 10 instead of the figure 60.

The fluidity test on which the above fluidity figures are base is as follows:

Five grams commercial starch and 10 cc. of 25° C. distilled water are put into a beaker of 300 cc. capacity. The contents of the beaker are mixed by a mechanical mixer consisting of a rotating beaker-holder having an R. P. M. of 200 and an iron mixing ball which is lowered into the beaker's contents by means of a wire. After the mixer is in rotation, 90 cc. of 25° C. 1% sodium hydroxide solution is introduced into the beaker. The mixing is stopped after 3 minutes from the time that the caustic is poured in. The iron ball is removed from the beaker's contents and allowed to hang on the beaker's side by means of the wire. The beaker is placed in a tempering bath at 25° C. and the ball is allowed to drain for one and a half minutes and then removed. The beaker stands in the tempering bath for 29 minutes and 40 seconds, after which the contents of the beaker are poured into a funnel 4 inches in diameter, having a tip consisting of a glass tube drawn to an orifice such that it will take 70 seconds for 100 cc. of water to run through the funnel. The glass tube is secured to the stem of the funnel by a rubber tubing. The distance from the top of the funnel to the bottom of the stem of the funnel should be 5 inches. The flow of paste from the funnel is prevented by holding a finger on the tip.

The paste is allowed to flow from the funnel into a 100 cc. cylinder graduate by removing the finger from the tip. This is done 20 seconds after the beaker is removed from the tempering bath.

The paste is allowed to flow into the graduate for exactly 70 seconds and the volume in the graduate is observed.

Fluidity equals volume in the graduate per 70 seconds.

The funnel is standardized in accordance with a master instrument, but it will be sufficient to say that the tip of the funnel should have an orifice of such character that the fluidity, measured as above, will be 50 for a thin boiling starch made acording to the following prescription:

8000 gallons of second American filter starch at 22° Baumé containing about 31,600 pounds of starch, dry substance, is mixed with dilute sulfuric acid until 10 cc. of filtrate from the starch milk requires 8 to 8.5 cc. of a one-tenth normal caustic soda solution to neutralize it, and the starch milk is converted at 124° F. for 12 hours. The modified starch is then neutralized with soda ash to 5.6 pH, dewatered and washed on an American filter and dried. When the term "fluidity" is used herein, it means fluidity measured by this test.

The Scott test herein referred to is conducted as follows:

28.35 grams of 12% moisture starch to be tested is mixed with 280 cc. of distilled water at room temperature. The beaker containing the mixture is put into a boiling water bath and stirred constantly for five minutes by means of a mechanical agitator rotating at 200 revolutions per minute. At the end of five minutes the beaker is covered with a watch glass and the contents allowed to boil for another period of five minutes. At the end of ten minutes the watch glass is removed, the condensate is drained back and the material stirred at the above rate, the draining and stirring taking ten seconds. The watch glass is put back on the beaker and the mixture allowed to boil for one minute and fifty seconds or until twelve minutes time has elapsed. The watch glass is removed, the condensate is drained back into the beaker and contents stirred, these operations taking fifteen seconds. At the end of twelve minutes and fifteen seconds, elapsed time, the contents of the beaker is transferred to a Scott cup, described below, and at the end of fifteen minutes, total elapsed time, the plunger valve of the cup is withdrawn, allowing the paste to pass into a graduated cylinder arranged below the cup. The Scott index for any given paste is the number of seconds required for the delivery of 100 cc. of the starch paste from the cup. The Scott cup is a cup or funnel having a discharge tube in the bottom about 3.175 mm. long with an orifice about 1.588 mm. in diameter which is closed by a plunger valve. The orifice is adjusted as to diameter on the basis of a master cup.

The average commercial 50 fluidity thin boiling corn starch made according to the above prescription will have a Scott of about 40.

When the term "Scott" is used herein, it means viscosity as measured by this test; which, it will be understood, is a test for measuring thin boiling starches, thick boiling starches being measured for viscosity by a somewhat different Scott test.

I claim:

1. Confection of the gum-drop type containing acid hydrolyzed, thin boiling corn starch of substantially 60 fluidity, the Scott of which is about 70.

2. Confection of the gum-drop type containing acid hydolyzed, thin boiling starch, the Scott viscosity of which for a given fluidity is substantially higher than the Scott of equation $$\text{fluidity} = \frac{2000}{\text{Scott viscosity}}$$

HARRY MEISEL.